Patented Mar. 6, 1945

2,370,809

UNITED STATES PATENT OFFICE 2,370,809

REMOVAL OF ACETYLENES FROM GASEOUS MIXTURES OF HYDROCARBONS

Charles E. Morrell, Roselle, and Miller W. Swaney, Cranford, N. J., assignors to Standard Oil Development Company, a corporation of Delaware No Drawing. Application December 27, 1940, Serial No. 371,998

8 Claims. (Cl. 260—677)

This invention relates to improvements in the separation and segregation of olefins and diolefins from mixtures of saturated and unsaturated hydrocarbons and particularly it relates to the removal of acetylenes from mixtures containing olefins and/or diolefins without the formation of explosive substances.

All cracked gases contain small amounts of acetylenes, including acetylene, $C_2H_2$, methylacetylene, $CH_3-C\equiv CH$, ethylacetylene,

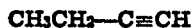

etc. Butadiene-containing fractions prepared by thermal processes and suitable as raw materials for producing pure butadiene by extraction methods likewise contain traces of these alpha-acetylenes. When amino-copper complexes are employed for the purpose of selectively extracting butadiene from such cracked fractions such as the butadiene-butene mixtures resulting from the dehydrogenation of butenes at high temperatures or from the pyrolysis of other hydrocarbon materials, it is desirable to remove the alpha-acetylenes before the $C_4$ feed is sent to the butadiene absorption system. This may be advantageously accomplished by first passing the butadiene-butene mixture containing traces of acetylenes through a prescrubber containing an ammoniacal cuprous acetate solution of about 1 molal copper content (1 gram atom of copper per liter) before being sent to butadiene absorbers employing ammoniacal cuprous acetate solutions of much higher copper content, for example, four molal copper. When a $C_4$ gas containing small quantities of acetylenes is contacted with an ammoniacal cuprous acetate solution the alpha-acetylenes are rapidly and quantitatively removed and precipitated as insoluble cuprous acetylides ($Cu_2C_2.H_2O$ from $HC\equiv CH$, $Cu-C\equiv C-CH_2CH_3$ from ethylacetylene, etc.). This may continue until all the cuprous copper in solution is used up in this manner.

In place of basic cuprous salt solutions, suspensions of insoluble cuprous hydroxide, CuOH or cuprous hydroxy chloride, $Cu_2(OH)Cl$, may be employed for removing acetylenes. With insoluble cuprous hydroxide acetylene itself is quantitatively absorbed, forming insoluble cuprous acetylide. Ethylacetylene is likewise quantitatively removed from gas streams when contacted with a suspension of cuprous hydroxide in water.

The precipitated copper acetylides are extremely dangerous when dry, exploding violently when struck or when subjected to heat, although they are fairly safe when wet. When copper acetylides precipitated in the manner described above are allowed to dry, they are very explosive.

According to this invention the removal of acetylenes from cracked gases is accomplished without danger by effecting the precipitation of the copper acetylides in the presence of any solid material capable of being readily suspended in the reaction medium (i. e., materials capable of settling very slowly) and capable of mixing intimately with the precipitated acetylides. Preferred materials include gelatinous metal hydroxides such as alumina gel, silica gel, cuprous hydroxide, gelatin, gum arabic, etc.

Thus, when a gelatinous metal hydroxide that is insoluble in water, such as gelatinous aluminum hydroxide is suspended in an ammoniacal cuprous solution or in a cuprous hydroxide slurry, and the gases containing acetylenes are passed in, the insoluble copper acetylides formed remain evenly distributed throughout the alumina. Thus when the precipitates are filtered and the gel dried, the copper acetylides therein are found to be no longer explosive either to shock or to heat. The acetylenes may be removed from gas streams by a prescrubber tower containing an ammoniacal cuprous acetate solution of 1 mol/liter copper contact, containing about 2 mols of aluminum hydroxide (gelatinous) per atom of copper, through which the acetylene-containing gas is passed. When the copper is used up the solution is then acidified with dilute (or strong) hydrochloric acid to dissolve the alumina and the copper acetylides. As an alternative, sulfuric acid may first be added to dissolve the alumina, and hydrochloric acid subsequently added to dissolve the copper acetylides since these acetylides are not dissolved by sulfuric acid.

In place of basic cuprous salt solutions containing alumina gel or other suitable material, an aqueous suspension of cuprous hydroxide alone can be used for the safe precipitation of acetylides provided only 10-15% of the copper hydroxide is used for reaction with the acetylenes, the remainder acting as the dispersing agent for the copper acetylides, or, by mixing some other material, such as alumina or silica gel, with the cuprous hydroxide suspension, substantially all of the cuprous hydroxide may be safely used for the conversion of the acetylenes to the copper acetylides.

This invention may also be applied to the precipitation of acetylenes with other metal salt solutions such as silver salt solutions.

The danger in the removal of acetylenes is not that of precipitating them as insoluble copper acetylides, but rather in allowing these copper acetylides to become dry, and thus explosive. The present invention resides in effecting this precipitation quantitatively in the presence of gelatinous metal hydroxide or other inert suspended material, so that even should the mixed precipitate become dry it would not be explosive, and in dissolving these copper acetylides in situ through the proper use of various strengths of hydrochloric acid. Other substances that form gelatinous or inert precipitates in an aqueous solution or slurry or by the addition of ammonia or other base, may be used in place of aluminum hydroxide without departing from this invention.

Example 1

Into an aqueous solution of ammoniacal cuprous acetate (1 molal copper) was passed acetylene, $C_2H_2$, and its acetylide, $Cu_2C_2.H_2O$, was precipitated as a dark red flocculent solid. This was filtered and air-dried at room temperature. When dropped on a hot-plate or struck with a hammer this material exploded violently. When wet it could not be decomposed by hammer blows or by being placed in boiling water.

Example 2

Into an aqueous solution of ammoniacal cuprous acetate (0.2 molal copper) containing in suspension one mol per liter of gelatinous aluminum hydroxide was passed acetylene, $C_2H_2$. The insoluble copper acetylide, $Cu_2C_2.H_2O$, which was formed remained intimately admixed with the gelatinous alumina and did not tend to flocculate. Precipitation was continued until all the cuprous ion was precipitated as acetylide. The solid mixture was filtered from the liquid and then air-dried. This could not be exploded by being struck, crushed, or placed on a hot-plate.

Example 3

Insoluble cuprous ethylacetylide, yellow

$$Cu-C\equiv C-CH_2CH_3$$

was prepared by passing ethylacetylene gas into an ammoniacal cuprous acetate solution. When air-dried, this acetylide exploded when dropped on the hot-plate.

Example 4

Into an aqueous solution of ammoniacal cuprous acetate (0.5 molal Cu) containing in suspension 1 mole per liter of gelatinous aluminum hydroxide was passed ethylacetylene gas until all the cuprous ion was precipitated as cuprous ethylacetylide. The mixed precipitate was filtered and air-dried. The resulting solid did not explode when dropped on the hot-plate but simply slowly charred, denoting a slow harmless decomposition.

Example 5

Some of the solution of Example 2 was removed (prior to filtration) and to it was added enough hydrochloric acid to dissolve the alumina and give a resulting solution of about 10% HCl strength. After a few moments the precipitate of cuprous acetylide had dissolved in the acid.

Example 6

To a portion of the solution of Example 4 (prior to filtration) was added enough hydrochloric acid to dissolve the gelatinous alumina and give an acid solution of about 1% strength. After a few minutes shaking the cuprous ethylacetylide precipitate dissolved completely.

Example 7

Into an aqueous suspension of yellow cuprous hydroxide there was passed a 2% acetylene gas in an amount sufficient to react with only about 10% of the available cuprous hydroxide. The acetylene was removed completely from the gaseous feed and the resulting mixed precipitate of copper acetylide and copper hydroxide was found to be non-explosive even when dried.

Similar results were also obtained when using a gas containing 5% ethylacetylene.

By using a suspension of cuprous hydroxide mixed with alumina gel or silica gel, substantially all of the cuprous hydroxide could be utilized for the reaction with the acetylenes and the resulting copper acetylides were obtained in intimate mixture with the alumina in a harmless condition.

We claim:

1. In the process of removing acetylenes from gaseous mixtures of saturated and unsaturated hydrocarbons with an aqueous solution of a cuprous salt, the improvement which comprises precipitating the acetylenes by contacting with an aqueous basic cuprous salt solution containing in suspension a water insoluble metallic hydroxide.

2. In the process of removing acetylenes from gaseous mixtures of saturated and unsaturated hydrocarbons with an aqueous solution of a cuprous salt, the improvement which comprises precipitating the acetylenes by contacting with an aqueous basic cuprous salt solution containing in suspension a water insoluble metallic hydroxide selected from the group of hydroxides consisting of aluminum hydroxide gel, silica gel and cuprous hydroxide.

3. In the process of removing acetylene from a gaseous mixture of saturated and unsaturated hydrocarbons the improvement which comprises contacting a gaseous mixture of saturated and unsaturated hydrocarbons with an aqueous basic cuprous acetate solution containing in suspension water insoluble cuprous hydroxide.

4. In the process of removing acetylene from a gaseous mixture of saturated and unsaturated hydrocarbons the improvement which comprises contacting a gaseous mixture of saturated and unsaturated hydrocarbons with an aqueous basic cuprous acetate solution containing in suspension water-insoluble aluminum hydroxide.

5. In the process of removing acetylene from a gaseous mixture of saturated and unsaturated hydrocarbons the improvement which comprises contacting a gaseous mixture of saturated and unsaturated hydrocarbons with an aqueous basic cuprous acetate solution containing in suspension water-insoluble silica gel.

6. The process of removing acetylenes from hydrocarbon mixtures of saturated and unsaturated hydrocarbons which comprises contacting the hydrocarbon mixture of saturated and unsaturated hydrocarbons with an aqueous basic cuprous salt solution containing in suspension a water-insoluble metallic hydroxide, separating the insoluble solids and treating the said insoluble solids with an inorganic acid.

7. The process of separating acetylenes from a hydrocarbon mixture of saturated and unsaturated hydrocarbons which comprises contacting the hydrocarbon mixture of saturated and unsaturated hydrocarbons with an aqueous ammoniacal cuprous acetate solution containing in suspension there cuprous hydroxide, separating the insoluble solids and treating the said insoluble solids with hydrochloric acid.

8. The process of removing acetylenes from hydrocarbon mixtures of saturated and unsaturated hydrocarbons which comprises contacting the saturated and unsaturated hydrocarbons with an ammoniacal cuprous acetate solution containing in suspension there a water insoluble metal hydroxide, separating the solids, treating the solids with sulfuric acid, separating the residual solids and treating the residual solids with hydrochloric acid.

CHARLES E. MORRELL.
MILLER W. SWANEY.